US008943269B2

(12) United States Patent
Puttaswamy Naga et al.

(10) Patent No.: US 8,943,269 B2
(45) Date of Patent: Jan. 27, 2015

(54) APPARATUS AND METHOD FOR MEETING PERFORMANCE METRICS FOR USERS IN FILE SYSTEMS

(75) Inventors: Krishna P. Puttaswamy Naga, Metuchen, NJ (US); Murali Kodialam, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 433 days.

(21) Appl. No.: 13/446,010

(22) Filed: Apr. 13, 2012

(65) Prior Publication Data
US 2013/0275669 A1   Oct. 17, 2013

(51) Int. Cl.
G06F 12/08   (2006.01)
G06F 11/30   (2006.01)
G06F 12/12   (2006.01)

(52) U.S. Cl.
CPC ............ *G06F 12/0866* (2013.01); *G06F 12/12* (2013.01); *G06F 11/3037* (2013.01)
USPC .................... 711/113; 711/159; 711/E12.019

(58) Field of Classification Search
CPC .. G06F 12/0866; G06F 11/3037; G06F 12/12
See application file for complete search history.

(56) References Cited

U.S. PATENT DOCUMENTS

| 6,745,304 | B2 | 6/2004 | Playe |
| 7,971,001 | B2 | 6/2011 | Petev et al. |
| 8,151,094 | B2 * | 4/2012 | Vera et al. ..................... 712/220 |
| 8,719,627 | B2 | 5/2014 | Watson et al. |
| 2005/0071599 | A1 * | 3/2005 | Modha et al. ................. 711/170 |
| 2005/0114621 | A1 * | 5/2005 | Lahiri et al. ................... 711/170 |
| 2006/0075007 | A1 * | 4/2006 | Anderson et al. ............. 707/206 |
| 2010/0153341 | A1 | 6/2010 | Driesen et al. |
| 2012/0221845 | A1 | 8/2012 | Ferris |
| 2013/0031545 | A1 | 1/2013 | Choudhury et al. |
| 2013/0085989 | A1 | 4/2013 | Nayyar et al. |
| 2013/0238572 | A1 | 9/2013 | Prahlad et al. |

OTHER PUBLICATIONS

N. Megiddo and D. Modha, "ARC: A Self-Turning, Low Overhead Replacement Cache," Proc. of FAST, 2004. Apr. 2003.
J. Wilkes, R. Golding, C. Staelin, and T. Sullivan, "The HP Autoraid Hierarchical Storage System," ACM Transactions on Computer Systems, Feb. 14, 1996.
Brocade Communications Systems, Inc, "Brocade File Lifecycle Manager (FLM) 4.0 Administration Guide," May 29, 2007.

(Continued)

*Primary Examiner* — Christian P Chace
*Assistant Examiner* — Eric Loonan
(74) *Attorney, Agent, or Firm* — Wall & Tong, LLP

(57) ABSTRACT

A data block storage management capability is presented. A file system includes a plurality of data blocks which are managed using a first storage service and a second storage service, where the first storage service has a lower storage cost and a higher input-output cost than the second storage service. The data blocks stored using the second storage service have associated therewith respective expected storage durations indicative of respective lengths of time for which the data blocks are to be stored using the second storage service (which may be the same or different across the ones of the data blocks stored using the second storage service). The expected storage durations of the data blocks are modified based on a comparison of an expected hit rate of the second storage service and a current hit rate of the second storage service or current hit rates of the data blocks.

20 Claims, 5 Drawing Sheets

(56) References Cited

OTHER PUBLICATIONS

Google, "S3 Backer, FUSE-Based Single File Backing Store via Amazon S3," http://code.google.com/p/s3backer/wiki/ChoosingBlockSize, printed Jan. 10, 2012.
Wikipedia, "Hierarchical Storage Management," http://en.wikipedia.org/wild/Hierarchical storage management, printed Jan. 10, 2012.
S.-H. Gary Chan and F. A. Tobagi, "Modeling and Dimensioning Hierarchical Storage Systems for Low-Delay Video Services," IEEE Transactions on Computers, vol. 52, No. 7, Jul. 2003.
Amazon, "Elasticache," http://aws.amazon.com/elasticache/, printed Jan. 10, 2012.
Amazon, "Amazon Simple Storage Service FAQS," http://aws.amazon.com/s3/faqs/, printed Jan. 10, 2012.
Amazon, "EBS to S3 Snapshot Block Size," https://forums.aws.amazon.com/message.jspa?messageID=142082, printed Jan. 10, 2012.
Microsoft, "Windows Azure Caching Service," http://msdn.microsoft.com/enus/library/windowsazure/gg278356.aspx, printed Jan. 10, 2012.
Amazon, "Amazon Elastic Block Store (EBS)," http://aws.amazon.com/ebs/, printed Jan. 10, 2012.
A. W. Leung, S. Pasupathy, G. Goodson, and E. L. Miller, "Measurement and Analysis of Large-Scale Network File System Workloads," Proc. of the USENIX ATC, Boston, MA, 2008, Jun. 2008.
Wheeler, Jim "Data Lifecycle Management: Hard Drives are not Enough." Feb. 2005, Computer Technology Review, vol. 25, Issue 2, pp. 34-35.
Spring et al., "A Protocol-Independent Technique for Eliminating Redundant Network Traffic," SIGCOMM Proceedings of the Conference on Applications, Technologies, Architectures, and Protocols for Computer Communication, Aug. 28, 2000, pp. 87-95, ACM, New York, NY, USA.
Liu, "Using locality and interleaving information to improve shared cache performance," Jan. 1, 2009, (Order No. 3359458, University of Maryland, College Park), ProQuest Dissertations and Theses, Retrieved from http://search.proquest.com/docview/304923132?accountid=14753.
Bhadkamkar, et al., "BORG: Block-ReORGanization for Self-Optimizing Storage Systems," Proceedings of the 7th Conference on File and Storage Technologies (FAST), Berkeley, CA, USA, Feb. 24, 2009.
Isaac, "Hierarchical Storage Management for Relational Databases," $12^{th}$ IEEE Symposium on Mass Storage Systems, Monterey, CA, USA, Apr. 26-29, 1993.
Karlin et al., "Competitive Randomized Algorithms for Non-Uniform Problems," Proc. of SODA, Jan. 1, 1990.
Narayanan, et al., "Write Offloading: Practical Power Management for Enterprise Storage," Proc. of FAST, Nov. 1, 2008.

* cited by examiner

APPARATUS AND METHOD FOR MEETING PERFORMANCE METRICS FOR USERS IN FILE SYSTEMS

TECHNICAL FIELD

The invention relates generally to storage of data blocks and, more specifically but not exclusively, to storage of data blocks of file systems.

BACKGROUND

Data center based cloud services are rapidly becoming the choice of enterprises to host their data, including hosting of mission-critical services such as application data and file systems. Additionally, many enterprises are moving their internal IT services to the cloud in order to reduce their IT capital expenses as well as reduce associated network management overhead. While enterprise data can be stored in several forms, enterprise data is typically stored in the form of a collection of files known as a file system. As storage services providers in the cloud allow users to expand/contract their storage outlay on a dynamic basis at various granularities of data storage capacity and storage time, cost optimization may drive the migration of enterprise data into the cloud. However, determination of a suitable type of storage service for a file system may be difficult as different storage service providers offer an array of storage services having differing technical specifications and pricing options.

SUMMARY

Various deficiencies in the prior art are addressed by embodiments for managing storage of data blocks of a cloud file system to meet performance metrics for users of the cloud file system.

In one embodiment, an apparatus includes a processor and a memory communicatively connected to the processor. The processor is configured to manage a plurality of data blocks of a file system using a first storage service and a second storage service. The first storage service has a lower storage cost and a higher input-output cost than the second storage service. The data blocks stored using the second storage service have associated therewith an expected storage duration indicative of a length of time for which the data blocks are to be stored using the second storage service. The processor is configured to determine an expected hit rate of the second storage service where the expected hit rate of the second storage service is based on at least one performance metric associated with the file system, monitor a current hit rate of the second storage service, and modify the expected storage duration of the data blocks stored using the second storage service based on a comparison of the expected hit rate of the second storage service and the current hit rate of the second storage service.

In one embodiment, at least one processor is used for managing a plurality of data blocks of a file system. The data blocks of the file system are stored using a first storage service and a second storage service, where the first storage service has a lower storage cost and a higher input-output cost than the second storage service. The data blocks stored using the second storage service have associated therewith an expected storage duration indicative of a length of time for which the data blocks are to be stored using the second storage service. The method includes determining an expected hit rate of the second storage service where the expected hit rate of the second storage service is based on at least one performance metric associated with the file system. The method further includes monitoring a current hit rate of the second storage service. The method further includes modifying the expected storage duration of the data blocks based on a comparison of the expected hit rate of the second storage service and the current hit rate of the second storage service.

In one embodiment, an apparatus includes a processor and a memory communicatively connected to the processor. The processor is configured to manage a plurality of data blocks of a file system using a first storage service and a second storage service. The first storage service has a lower storage cost and a higher input-output cost than the second storage service. The data blocks stored using the second storage service have associated therewith a respective plurality of expected storage durations indicative of respective lengths of time for which the data blocks are to be stored using the second storage service. The processor is configured to determine an expected hit rate of the second storage service where the expected hit rate of the second storage service is based on at least one performance metric associated with the file system. The processor is configured to monitor a current hit rate of one of the data blocks. The processor is configured to modify the expected storage duration of the one of the data blocks based on a comparison of the expected hit rate of the second storage service and the current hit rate of the one of the data blocks.

In one embodiment, at least one processor is used for managing a plurality of data blocks of a file system. The data blocks of the file system are stored using a first storage service and a second storage service, where the first storage service has a lower storage cost and a higher input-output cost than the second storage service. The data blocks stored using the second storage service have associated therewith a respective plurality of expected storage durations indicative of respective lengths of time for which the data blocks are to be stored using the second storage service. The method includes determining an expected hit rate of the second storage service where the expected hit rate of the second storage service is based on at least one performance metric associated with the file system. The method further includes monitoring a current hit rate of one of the data blocks. The method further includes modifying the expected storage duration of the one of the data blocks based on a comparison of the expected hit rate of the second storage service and the current hit rate of the one of the data blocks.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, a data block storage management capability is depicted and described herein, although various other capabilities also may be presented herein.

In at least some embodiments, the data block storage management capability is configured to manage storage of data blocks of a cloud file system.

In at least some embodiments, data blocks of a cloud file system are managed based on the required or desired performance of the cloud file system as well as cost considerations as. This is advantageous since, in some cases, focusing only on cost considerations in management of a cloud file system may ultimately lead to degradations in the performance of the cloud file system.

In at least some embodiments, data blocks of a cloud file system are managed based on one or more performance metrics specified for the cloud file system. In at least some such embodiments, data blocks of a cloud file system are managed in accordance with the specified performance metric(s) while also reducing (and in at least some cases optimizing) the associated costs of managing the cloud file system.

In at least some embodiments, data blocks of a cloud file system are managed by accepting as input performance metrics for the cloud file system and using heuristics to improve (and, in some cases, optimize) the cost of the cloud file system without violating the performance metrics, thereby dynamically adapting to the file system characteristics and the workload of the cloud file system.

Although primarily depicted and described herein with respect to embodiments in which the data block storage management capability is configured to manage storage of data blocks in a cloud file system, it is noted that the data block storage management capability may be configured to manage storage of data blocks in other types of file systems or, more generally, for storage of data blocks in memory.

Figure 1:
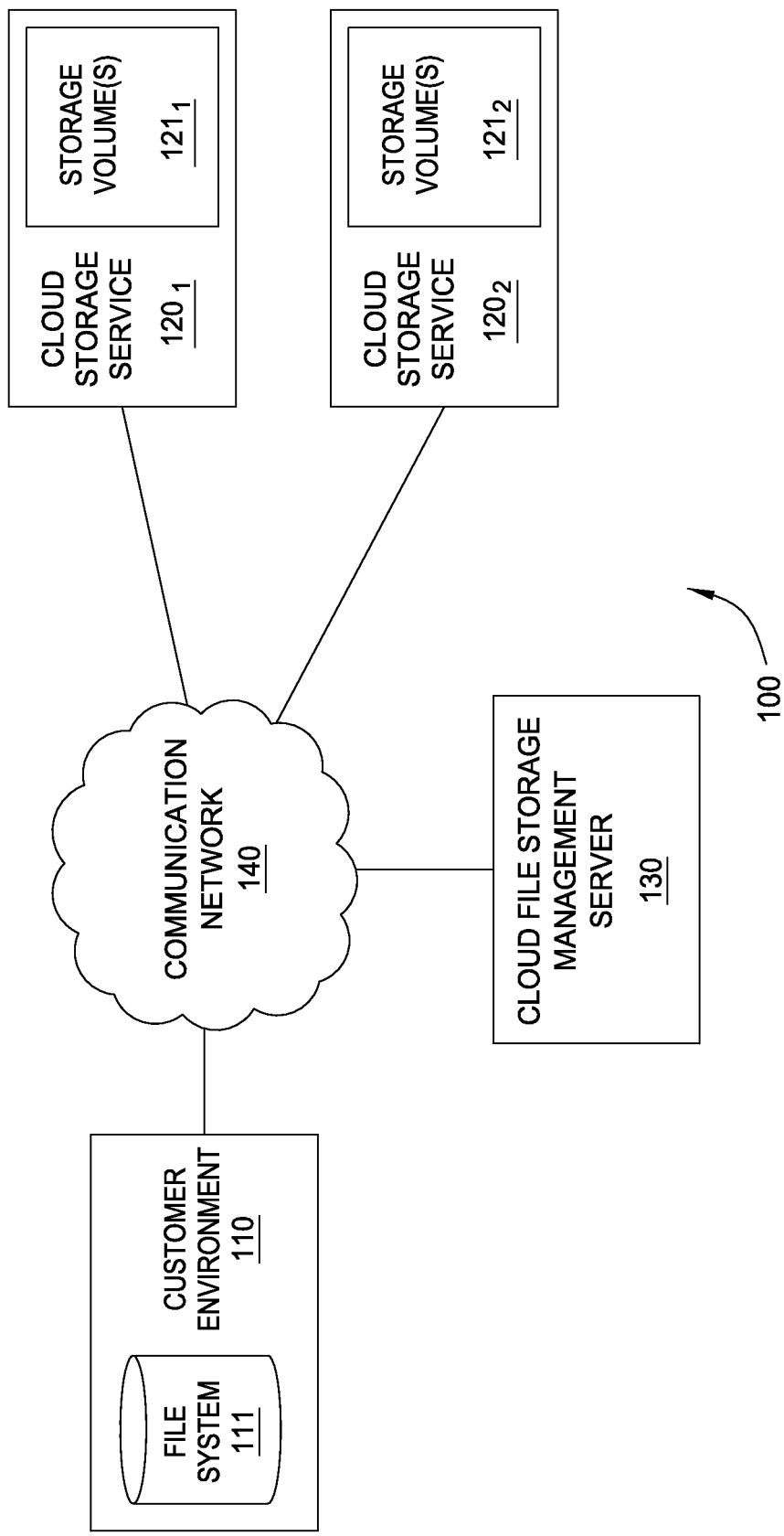
FIG. 1 depicts a high-level block diagram of an exemplary system including a plurality of cloud storage services and a cloud file storage management server configured to support management of data blocks of a file system using the cloud storage services.

FIG. 1 depicts a high-level block diagram of an exemplary system including a plurality of cloud storage services and a cloud file storage management server configured to support management of data blocks of a file system using the cloud storage services.

As depicted in FIG. 1, system 100 includes a customer environment 110, a pair of cloud storage services $120_1$-$120_2$ (collectively, cloud storage services 120), a cloud file storage management server 130, and a communication network 140.

The customer environment 110 is a customer environment which includes a file system 111 that the customer would like to maintain in the cloud. For example, the customer may be an enterprise customer, a business customer, an individual customer, or the like. The customer environment 110 may include various elements (e.g., one or more user terminals via which a user or users may administer and use cloud services of cloud storage services 120, telecommunication equipment, or the like, as well as various combinations thereof), depending on the type and size of the customer. The customer environment 110 includes one or more devices configured to access communication network 140 (omitted for purposes of clarity). The file system 111 includes a plurality of files, each composed of one or more data blocks. The data blocks of file system 111 are maintained within the cloud using the cloud storage services 120. The data blocks of file system 111, once stored within the cloud using the cloud storage services 120, may be accessed by users from customer environment 110 in any suitable manner.

The cloud storage services 120 each are configured to provide cloud-based storage of data for customers (illustratively, cloud-based storage of the file system 111 of the customer of customer environment 110). The cloud storage services $120_1$-$120_2$ support cloud-based storage of the file system 111 using storage volume(s) $121_1$-$121_2$ (collectively, storage volumes 121), respectively. The storage volume(s) 121 of a cloud storage service 120 are allocated for the customer of customer environment 110 for use in storing files of the file system 111. The data blocks of the file system 111 are stored using the storage volumes 121 of cloud storage services 120 under the control of the cloud file storage management server 130. Although omitted for purposes of clarity, it will be appreciated that each of the cloud storage services 120 is supported using various types of equipment which may be deployed in data centers of cloud service providers (e.g., networking devices, aggregator switches, racks, top-of-rack switches, hypervisors, blade servers, blades, processors, or the like, as well as various combinations thereof).

The cloud storage services $120_1$ and $120_2$ have differing characteristics associated therewith. For example, cloud storage services 120 may have one or more of differing technical specifications, differing pricing/cost models, or the like, as well as various combinations thereof. The pricing/cost models of cloud storage services 120 may specify one or more pricing/cost options. In one embodiment, for example, pricing/cost models of cloud storage services 120 may specify pricing options such as storage pricing/cost (e.g., X amount of storage capacity allocated for Y length of time), access pricing/cost (e.g., X number of I/O requests with GET and PUT requests having different prices/costs associated therewith), bandwidth pricing/cost (e.g., per X amount of data incoming and/or per X amount of data outgoing), or the like, as well as various combinations thereof). The pricing/cost models may include fixed pricing/cost models (e.g., where prices/costs remain fixed over relatively long periods of time) and/or dynamic pricing/cost models (e.g., where prices/costs change dynamically over time (even, in some cases, over relatively short periods of time), such as in spot pricing of storage resources and/or other types of resources). In at least some of the cloud storage services 120, the pricing/cost models of the cloud storage services 120 enable the cloud resources of the cloud storage services 120 to be purchased on a granular basis on fine time scales (e.g., storage resources in terms of GB per hour, storage accesses in terms of a million accesses per day, or the like). It will be appreciated that, in analyzing such pricing/cost models, different cloud storage services 120 may support various combinations of such pricing/cost options related to the underlying technical capabilities providing for such pricing/cost options. For example, cloud storage service $120_1$ may provide relatively low-cost storage while charging a relatively high cost for data accesses. Similarly, for example, cloud storage service $120_2$ may provide relatively high-cost storage while charging a relatively low cost for data accesses. As a result of these varying pricing/cost policies of the cloud storage services 120, some cloud storage services 120 may be preferred over other cloud storage services 120 depending on various characteristics of the file system to be stored in the cloud (e.g., size of file system, types of files, sizes of files, sizes of data blocks of which the files are composed, access frequency of files, access frequency of data blocks of which the files are composed, or the like, as well as various combinations thereof).

The cloud storage services 120 may be services provided by one or more cloud service providers. For example, cloud storage services 120₁ and 120₂ may be varying cloud storage services of AMAZON (e.g., AMAZON S3 and AMAZON EBS). For example, cloud storage services 120₁ may be a cloud storage service of AMAZON while cloud storage services 120₂ may be a cloud storage service of MICROSOFT. In this manner, the customer of customer environment 110 may be provided flexibility to store files of its file system 111 across varying cloud storage services of one cloud service provider, or even across varying cloud storage services of multiple cloud service providers.

The cloud storage services 120 may represent a first cloud storage service having a relatively low storage cost and a relatively high input-output cost (illustratively, first cloud storage service 120₁) and a second cloud storage service having a relatively high storage cost and a relatively low input-output cost (illustratively, second cloud storage service 120₂). For example, first cloud storage service 120₁ may be a relatively low storage cost and high-latency system such as AMAZON S3 whereas second cloud storage service 120₂ may be a relatively high storage cost and low-latency system such as AMAZON ELASTICACHE or AMAZON EBS.

The cloud file storage management server 130 is configured to provide various functions of the cloud file system management capability.

In one embodiment, cloud file storage management server 130 is configured to store data blocks of file system 111 in a manner for minimizing the costs of storing and accessing the data blocks of the file system 111. In one embodiment, the cost of storing data blocks of file system 111 in second cloud storage service 120₂ is minimized by reading a data block from first cloud storage service 120₁ and moving it into the second cloud storage service 120₂ and keeping it in the second cloud storage service 120₂ until the cost of storing the data block in the second cloud storage service 120₂ equals or exceeds the I/O cost of accessing the data block from the first cloud storage service 120₁. In this embodiment, the expected storage duration of the data block, representing the amount of time that the data block is expected or scheduled to be stored in the second cloud storage service 120₂ (after which it is expected to be kicked out of the second cloud storage service 120₂ and then only be stored in the first cloud storage service 120₁) is equal to the ratio of the I/O cost of reading the data block from the first cloud storage service 120₂ to the storage cost of storing the data block in the second cloud storage service 120₂. This expected storage duration may be denoted as expected storage duration T.

In the above-described embodiment in which only cost is considered, however, if the data block is accessed slightly after the expiration of the expected storage duration T, then the data block will need to be fetched from the first cloud storage service 120₁ into the second cloud storage service 120₂ again, thereby leading to a lower cache hit rate and, thus, lower performance. Accordingly, in one embodiment, the cloud file storage management server 130 is configured to recognize such an access pattern for file system 111 and to initiate actions for improving the performance of the file system 111 (e.g., via an improvement of the hit rate of the second cloud storage service 120₂) with only a slight increase in the cost of maintaining the file system 111.

In the above-described embodiment in which only cost is considered, if the data block is accessed within a relatively short inter-arrival-time (e.g., which may be on the order of several seconds to several minutes), then this access interval value may be much lower than the value of expected storage duration T (e.g., which may be on the order of hours). Accordingly, in one embodiment, the cloud file storage management server 130 is configured to initiate actions for removing data blocks from second cloud storage service 120₂ earlier than the expiration of the expected storage duration T, thereby maintaining high performance of file system 111 while also reducing the cost of file system 111 significantly.

In one embodiment, cloud file storage management server 130 is configured to store data blocks of file system 111 in accordance one or more performance metrics specified by the customer for the file system 111, while also reducing (and in at least some cases optimizing) the associated costs of storing data blocks of file system 111. In other words, the performance of the file system 111 may be maintained while also reducing the cost of the file system 111 by operating with the performance as a high priority (e.g., by meeting the required hit rate and/or any other performance metric(s)) while dynamically optimizing to reduce cost. An exemplary method for storing data blocks of file system 111 in accordance one or more performance metrics specified by the customer for the file system 111 as a whole (while also trying to reduce costs) is depicted and described with respect to FIG. 2. An exemplary method for storing data blocks of file system 111 in accordance one or more performance metrics specified by the customer for individual data blocks of the file system 111 (while also trying to reduce costs) is depicted and described with respect to FIG. 3.

The cloud file storage management server 130 is primarily presented, for purposes of clarity, within the context of a dual-service cloud storage model including two cloud storage services 120₁ and 120₂ (although it will be appreciated that any suitable number of cloud storage services 120 may be considered when managing storage of file system 111 of the customer 110). The operation of cloud file storage management server 130 may be better understood when presented within the context of a dual-service cloud storage model in which the first and second cloud storage services 120₁ and 120₂ are implemented as disk-based storage and cache-based storage, respectively. Accordingly, in at least some embodiments, first cloud storage service 120₁ may use disk-based storage (and, thus, may be referred to herein as a disk) and second cloud storage service 120₂ may use cache-based storage (and, thus, may be referred to herein as a cache). It will be appreciated that, in at least some embodiments, first and second cloud storage services 120₁ and 120₂ may be implemented using other types of storage, respectively.

Figure 2:
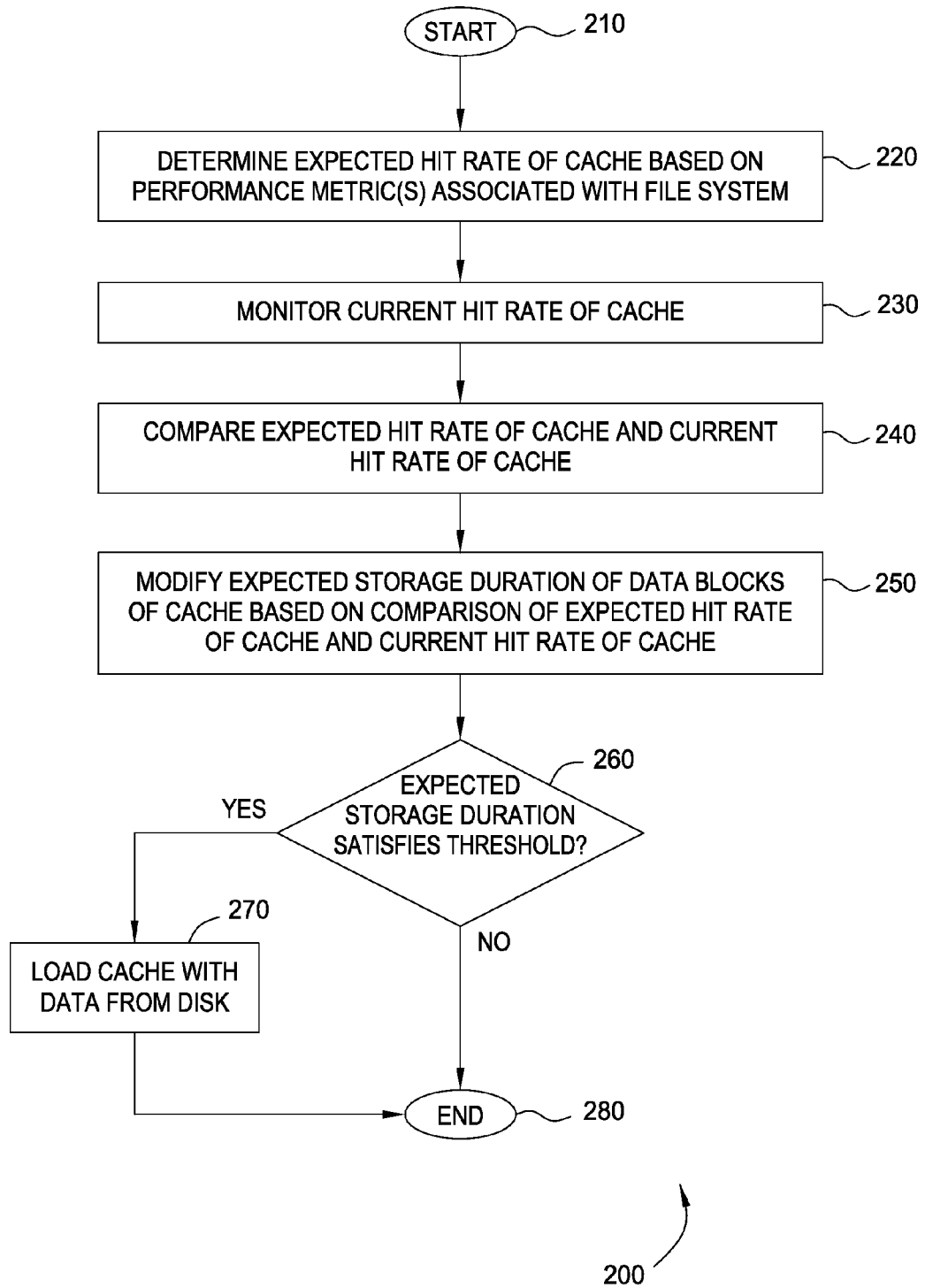
FIG. 2 depicts one embodiment of a method for managing storage of data blocks in a cloud storage system where the data blocks stored in a cache of the cloud storage system have a common expected storage duration associated therewith.

FIG. 2 depicts one embodiment of a method for managing storage of data blocks in a cloud storage system where the data blocks stored in a cache of the cloud storage system have a common expected storage duration associated therewith.

It is noted that, although primarily depicted and described within the context of an embodiment in which the two cloud storage services include disk storage and cache storage, the disk and cache of method 200 of FIG. 2 are intended to represent, more generally, a first cloud storage service having a relatively low storage cost and a relatively high input-output cost and a second cloud storage service having a relatively high storage cost and a relatively low input-output cost, respectively.

It is noted that the expected storage duration for the data blocks of the cache (denoted herein as T) may be initialized to any suitable value. In one embodiment, the expected storage duration for the data blocks of the cache is initialized to a value equal to or based on a ratio of the input-output cost of the disk to the storage cost of the cache.

It is noted that, although primarily depicted and described as being performed serially, at least a portion of the steps of method 200 may be performed contemporaneously and/or in a different order than presented in FIG. 2.

At step 210, method 200 begins.

At step 220, an expected hit rate of the cache is determined. The expected hit rate of the cache is based on a performance metric(s) associated with the file system.

The expected hit rate of the cache may be determined from memory (e.g., where the performance metric(s) is pre-processed for determining the expected hit rate of the cache) or may be determined on-the-fly based on the performance metric(s) associated with the file system.

The performance metric(s) associated with the file system may include any performance metric(s) suitable for use in measuring the performance of a file system.

In one embodiment, the performance metric is a cache hit fraction (which also may be referred to herein as a cache hit rate), which is indicative of a fraction of total input-output requests to the cloud file system that must be answered from the cache (which has the lowest latency). The cache hit rate directly translates into the service response time experienced by the end users of the cloud file system, and even into the throughput experienced by the end users of the cloud file system. Thus, satisfying the cache hit rate is expected to result in satisfaction of a number of other performance metrics suitable for use in measuring the performance of a cloud file system.

The performance metric(s) for the cloud file system may be specified in the form of a Service Level Agreement (SLA) and/or in any other suitable manner for specifying performance metrics.

The performance metric(s) for the cloud file system may be set by any suitable user or user(s) of the cloud file system. For example, such users may include one or more of an administrator(s) of the cloud file system, one or more end users of the cloud file system, or the like, as well as various combinations thereof.

It will be appreciated that the performance metric(s) may be updated at any time and, thus, that step 220 may be repeated at any suitable time.

At step 230, the current hit rate of the cache is monitored. In one embodiment, the current hit rate of the cache is updated after each input-output request to the cache. It will be appreciated that steps 230 is likely to be executed multiple times between execution of step 220 and execution of steps 240-260.

At step 240, the expected hit rate of the cache and the current hit rate of the cache are compared. The comparison of the expected hit rate of the cache and the current hit rate of the cache may be performed periodically.

At step 250, the expected storage duration of the data blocks of the cache is modified based on the comparison of the expected hit rate of the cache and the current hit rate of the cache. If the expected hit rate of the cache exceeds the current hit rate of the cache, the expected storage duration of the data blocks is increased. If the current hit rate of the cache exceeds the expected hit rate of the cache, the expected storage duration of the data blocks is decreased. The expected storage duration of the data blocks may be modified by any suitable amount (e.g., one second, thirty seconds, one minute, or any other suitable value).

At step 260, a determination is made as to whether the expected storage duration satisfies a threshold. The threshold may be defined in any suitable manner. In one embodiment, for example, the threshold may be defined as ten times the value of the default expected storage duration used at initialization time and the determination as to whether the expected storage duration satisfies a threshold is a determination as to whether the expected storage duration exceeds the threshold. If the expected storage duration satisfies the threshold, method 200 proceeds to step 270. If the expected storage duration does not satisfy the threshold, method 200 proceeds to step 280 where method 200 ends.

At step 270, the cache is loaded with data from the disk. The cache is loaded with a fraction of data from the disk that is equal to or approximately equal to the expected hit rate of the cache.

It will be appreciated that steps 240-260 (and, optionally, step 270 where the threshold is satisfied) are likely to be executed more often than execution of step 220 and less often than execution of step 230. In one embodiment, steps 240, 250, and 260 (and, optionally, step 270 where the threshold is satisfied) are executed periodically. The period length may be any suitable length of time (e.g., once each minute, once every four minutes, once every ten minutes, or the like).

At step 280, method 200 ends. Although depicted and described as ending for purposes of clarity, it will be appreciated that the various steps of method 200 may continue to be repeated when appropriate to provide the described functions.

It is noted that, although the method 200 of FIG. 2 is depicted and described as being a single process, the various steps of method 200 may be implemented using two or more processes configured to operate together to provide the described functions.

It is noted that, although method 200 primarily provides management of data blocks on a per file system basis (e.g., where a single expected storage duration value is used for all of the data blocks of the file system that are stored in the cache), one or more embodiments may provide management of data blocks on a per data block basis. In such embodiments, each data block of the file system that is stored in the cache has its own associated expected storage duration indicative of the length of time that the data block is to remain in the cache before being evicted from the cache such that it is only stored in the disk. The use of per data block control can lead to much finer control of data block placement and, thus, better performance and cost optimization. An exemplary embodiment is depicted and described with respect to FIG. 3.

Figure 3:
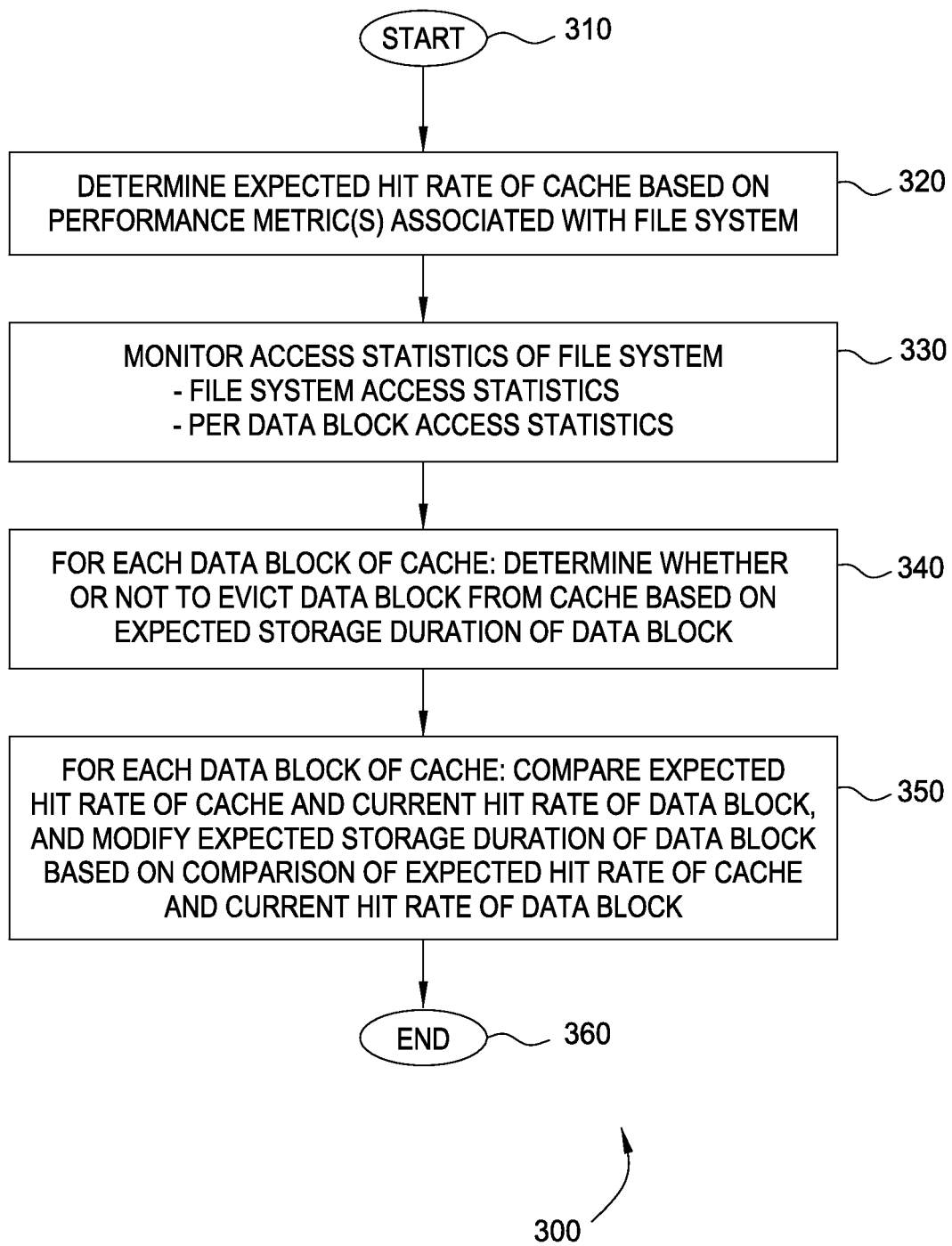
FIG. 3 depicts one embodiment of a method for managing storage of data blocks in a cloud storage system where the data blocks stored in a cache of the cloud storage system have individual expected storage durations associated therewith.

FIG. 3 depicts one embodiment of a method for managing storage of data blocks in a cloud storage system where the data blocks stored in a cache of the cloud storage system have individual expected storage durations associated therewith.

It is noted that although primarily depicted and described within the context of an embodiment in which the two cloud storage services include disk storage and cache storage, the disk and cache of method 300 of FIG. 3 are intended to represent, more generally, a first cloud storage service having a relatively low storage cost and a relatively high input-output cost and a second cloud storage service having a relatively high storage cost and a relatively low input-output cost, respectively.

It is noted that the expected storage durations for the data blocks of the cache (denoted herein as T) may be initialized to any suitable values. In one embodiment, the expected storage duration for a data block of the cache is initialized to a value equal to or based on a ratio of the input-output cost of the disk to the storage cost of the cache. In one embodiment, once there are a sufficient number of accesses to the data block, the expected storage duration for the data block is changed to the mean inter-arrival time of the data block.

It is noted that, although primarily depicted and described as being performed serially, at least a portion of the steps of method 300 may be performed contemporaneously and/or in a different order than presented in FIG. 3.

At step 310, method 300 begins.

At step 320, an expected hit rate of the cache is determined. The expected hit rate of the cache is based on a performance metric(s) associated with the file system.

The expected hit rate of the cache may be determined from memory (e.g., where the performance metric(s) is pre-processed for determining the expected hit rate of the cache) or may be determined on-the-fly based on the performance metric(s) associated with the file system.

The performance metric(s) associated with the file system may include any performance metric(s) suitable for use in measuring the performance of a file system.

In one embodiment, the performance metric is a cache hit fraction (which also may be referred to herein as a cache hit rate), which is indicative of a fraction of total input-output requests to the cloud file system must be answered from the cache (which has the lowest latency). The cache hit rate directly translates into the service response time experienced by the end users of the cloud file system, and even into the throughput experienced by the end users of the cloud file system. Thus, satisfying the cache hit rate is expected to result in satisfaction of a number of other performance metrics suitable for use in measuring the performance of a cloud file system.

The performance metric(s) for the cloud file system may be specified in the form of a Service Level Agreement (SLA) and/or in any other suitable manner for specifying performance metrics.

The performance metric(s) for the cloud file system may be set by any suitable user or user(s) of the cloud file system. For example, such users may include one or more of an administrator(s) of the cloud file system, one or more end users of the cloud file system, or the like, as well as various combinations thereof.

It will be appreciated that the performance metric(s) may be updated at any time and, thus, that step 320 may be repeated at any suitable time.

At step 330, access statistics are monitored. The access statistics include file system access statistics and per data block access statistics for each of the data blocks. The file system access statistics include the current hit rate of the cache. The per data block access statistics for a data block include the mean inter-arrival time for the data block, the number of hits for the data block, and the hit rate of the data block. In one embodiment, the appropriate access statistics are updated after each input-output request to the cache. It will be appreciated that execution of step 330 is likely occur more often than execution of step 320 and execution of steps 340-350.

At step 340, for each data block in the cache, a determination is made as to whether or not to evict the data block from the cache based on the expected storage duration of the data block. This determination may be performed in any suitable manner. In one embodiment, for a given data block having an expected storage duration associated therewith, this determination is performed by: (1) determining the expected storage duration of the data block, (2) determining, based on the expected storage duration of the data block, a time at which the data block is to be evicted from the cache, and (3) evicting the data block from the cache if the determined time at which the data block is to be evicted from the cache has passed. The determination may be performed periodically.

At step 350, for each data block of the cache, the expected hit rate of the cache and the current hit rate of the data block are compared and the expected storage duration of the data block is modified based on the comparison of the expected hit rate of the cache and the current hit rate of the data block. If the expected hit rate of the cache exceeds the current hit rate of the data block, the expected storage duration of the data blocks is increased. If the current hit rate of the data block exceeds the expected hit rate of the cache, the expected storage duration of the data blocks is decreased. The expected storage duration of the data blocks may be modified by any suitable amount (e.g., one second, thirty seconds, one minute, or any other suitable value).

At step 360, method 300 ends.

It is noted that, although the method 300 of FIG. 3 is depicted and described as being a single process, the various steps of method 300 may be implemented using two or more processes configured to operate together to provide the described functions.

It is noted that method 300 of FIG. 3 may be adapted to ensure that the minimum cache hit rate requested by the user is provided by the file system and, at the same time, the cost of the overall file system is reduced significantly compared to existing implementations.

It is noted that, although method 300 of FIG. 3 primarily depicts and describes an embodiment in which the expected storage durations of the data blocks are modified, in one embodiment an additional parameter may be used in conjunction with the expected storage duration in order to provide the functions of method 300 of FIG. 3. In one such embodiment, for each data block, in addition to the data block having the expected storage duration (T) associated therewith the data block also has a duration control parameter associated therewith. In this embodiment, the duration control parameter is related to the expected storage duration (T) as follows: storage duration of a data block=(1+duration control parameter)× T, where the duration control parameter is initialized to zero (0) such that the storage duration of a data block at initialization is equal to the expected storage duration (T).

In one embodiment, the determination as to whether or not to evict the data block from the cache based on the expected storage duration of the data block (i.e., step 340) is performed by: (1) determining the number of times that the data block has been accessed, (2) evicting the data block from the cache if the data block has been accessed more than once and the time since the last access to the data block is greater than [(1+duration control parameter)* mean-inter-arrival-time of the data block], (3) evicting the data block from the cache is the data block has not been accessed more than once and the time since the last access to the data block is greater than (1+duration control parameter)*average-first-hit-time-interval-of-data-block], and (4) allowing the data block to remain in the cache otherwise.

In one embodiment, the modification of the expected storage duration of the data block (i.e., step 350) is performed by modifying the duration control parameter of the data block as follows: (1) compare the current hit rate of the data block and the expected hit rate of the cache, and (2a) if the current hit rate of the data block does not exceed the expected hit rate of the cache, the duration control parameter associated with the data block is increased or (2b) if the current hit rate of the data block exceeds the expected hit rate of the cache, the duration control parameter associated with the data block is decreased. In this embodiment, the duration control parameter associated with the data block may be modified by any suitable value (e.g., 0.01, 0.05, 0.1, or the like).

It is noted that, although the foregoing embodiments describe use of a duration control parameter to control caching of data blocks, any other similar parameter may be used in a manner similar to use of the duration control parameter to provide such functions.

As described herein, cloud file storage management server 130 is configured to store data blocks of file system 111 in accordance one or more performance metrics specified by the customer for the file system 111, while also reducing (and in at least some cases optimizing) the associated costs of storing data blocks of file system 111. The cloud file storage management system 130 may be implemented in any suitable manner. An exemplary embodiment of cloud file storage management server 130 is depicted and described with respect to FIG. 4.

Figure 4:
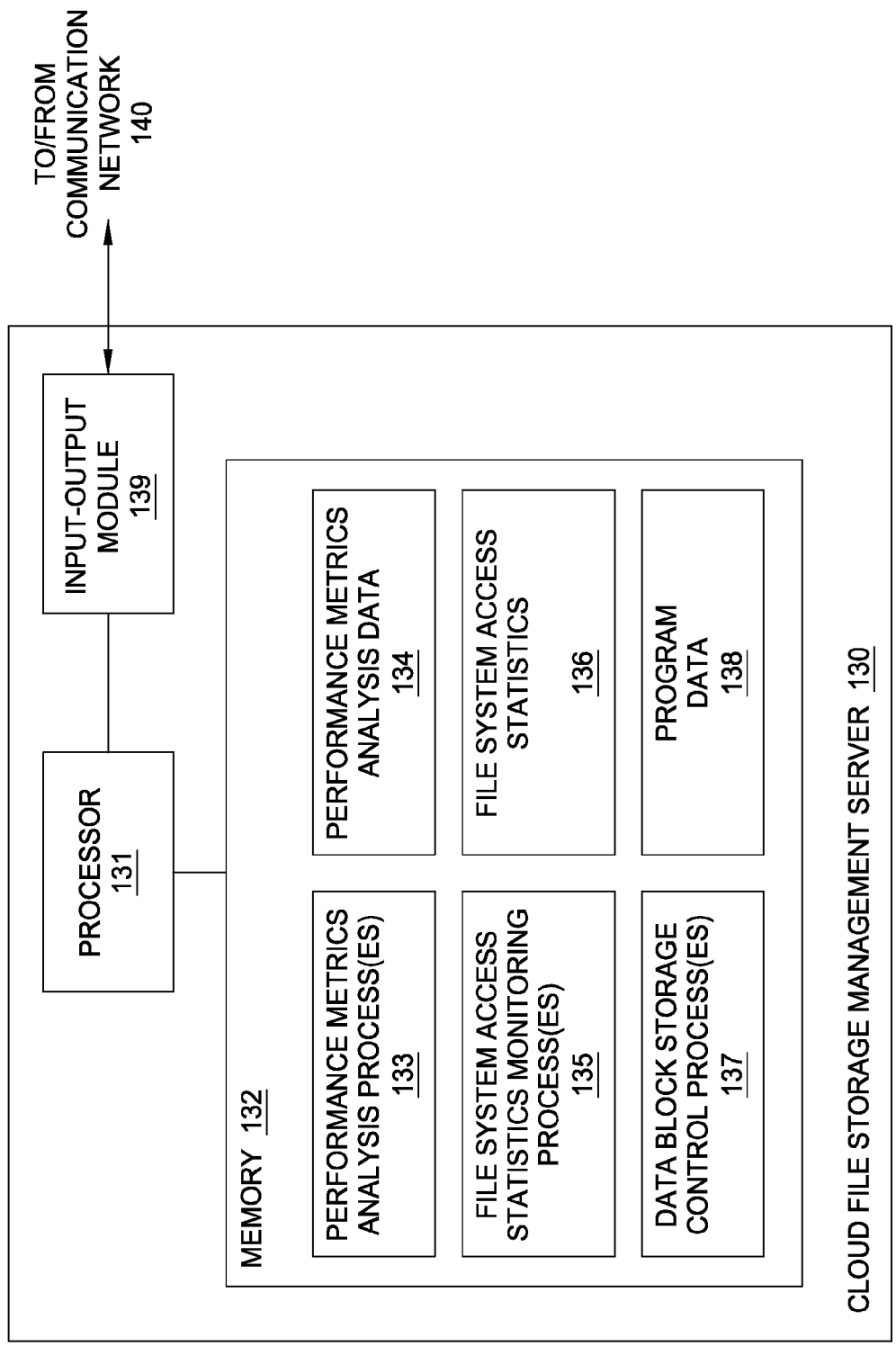
FIG. 4 depicts an exemplary embodiment of the cloud file storage management server of FIG. 1 configured to support the methods of FIGS. 2 and 3.

FIG. 4 depicts an exemplary embodiment of the cloud file storage management server of FIG. 1 configured to support the methods of FIGS. 2 and 3.

The cloud file storage management system 130 includes a processor 131, a memory 132, and an input-output interface 139. The processor 131 is coupled to both memory 132 and input-output interface 139.

The processor 131 is configured to access memory 132 for retrieving various processes and associated program data and executing the various processes using the associated program data to perform various functions depicted and described herein.

The memory 132 stores a performance metrics analysis process(es) 133 and associated performance metrics analysis data 134 which may include performance metrics provided by one or more users of the file system 111, one or more parameters derived from the performance metrics provided by one or more users of the file system 111 (e.g., expected hit rate of the cache or the like). The performance metrics analysis data 134 may include inputs to and outputs from the performance metrics analysis process 133. For example, performance metrics analysis process 133 may be configured to perform functions such as step 220 of FIG. 2, step 320 of FIG. 3, or the like.

The memory 132 stores a file system access statistics monitoring process(es) 135 and associated file system access statistics 136 which may include the current hit rate of the cache, the mean inter-arrival times for the data blocks, the number of hits for the data blocks, and the hit rates of the data blocks, or the like. The file system access statistics 136 may be maintained via execution of the file system access statistics monitoring process 135. For example, file system access statistics monitoring process 135 may be configured to perform functions such as step 230 of FIG. 2, step 330 of FIG. 3, or the like.

The memory 132 stores a data block storage control process(es) 137 and associated program data 138 which may include inputs to the data block storage control process 137, outputs from the data block storage control process(es) 137, or the like. For example, program data 138 may include a modified value of the expected storage duration for data blocks of the file system 111, modified values of the expected storage durations for data blocks of the file system 111, or the like, as well as various combinations thereof. For example, data block storage control process 137 may be configured to perform functions such as step 240-270 of FIG. 2, step 340-350 of FIG. 3, or the like.

The input-output interface 139 provides an interface via which cloud file storage management system 130 may interface with communication network 140 and, thus, may communicate with customer environment 110 and cloud storage services 120.

Although the cloud file storage management server 130 is primarily depicted and described herein as a standalone element accessible via communication network 140, it is noted that cloud file storage management server 130 may be deployed in various other locations. In one embodiment, for example, cloud file storage management server 130 may be deployed within the customer environment 110. In one embodiment, for example, cloud file storage management server 130 may be deployed within an environment of a cloud service provider (e.g., where each cloud storage service 120 is provided by a single cloud service provider). Various other arrangements are contemplated.

Although the cloud file storage management server 130 is primarily depicted and described herein as a standalone element, it is noted that the various functions of cloud file storage management server 130 may be deployed in various other ways. In one embodiment, for example, various functions of the cloud file storage management server 130 may be distributed across multiple instances of the cloud file storage management server 130 (which may be deployed at any suitable location(s)). In one embodiment, for example, various functions of cloud file storage management server 130 may be disposed on existing equipment available for hosting such functions (e.g., of one or more of the customer environment 110, one or more environments of one or more cloud service providers, the communication network 140, or the like, as well as various combinations thereof). It is noted that various combinations of such embodiments also are contemplated.

Although primarily depicted and described herein with respect to embodiments in which the performance metric(s) are associated with the file system 111 as a whole (e.g., using a single set of performance metrics, that includes one or more performance metrics, which is associated with all of the files of the file system 111), in at least one embodiment a plurality of sets of performance metrics (e.g., where each set of performance metrics includes one or more performance metrics) may be associated with respective portions of the file system 111. For example, different portions of the file system 111 (e.g., a file, a group of files, a directory, a group of directories, or the like, as well as various combinations thereof) may have different performance metrics associated therewith. In such embodiments, enforcement of the specified performance metrics may result in modifications related to execution of methods 200 and 3000 of FIG. 2 and FIG. 3, respectively.

In one embodiment, in the case of method 200 of FIG. 2, the multiple sets of performance metrics may be used to determine a value of expected storage duration best suited for the files of the file system 111 in view of the multiple sets of performance metrics.

In one embodiment, in the case of method 200 of FIG. 2, method 200 may be executed multiple times for the file system 111 (e.g., where method 200 is executed for each of the portions of the file system 111 having the different performance metrics associated therewith, respectively).

In one embodiment, in the case of method 300 of FIG. 3, the multiple sets of performance metrics may be used to determine multiple values of expected storage duration for the respective portions of the file system 111 with which the sets of performance metrics are associated, respectively. For example, for a file system having one thousand files organized into two directories having two sets of performance metrics associated therewith, each of the files in the first directory will have a first expected storage duration value associated therewith (determined based on the set of performance metrics associated with the files of the first directory) and each of the files in the second directory will have a second expected storage duration value associated therewith (determined based on the set of performance metrics associated with the files of the second directory).

Although primarily depicted and described herein with respect to use of two hierarchical layers of cloud storage services 120 to store data blocks of the files of the file system 111 (namely, disk and cache or, more generally, a first cloud storage service and a second cloud storage service), it will be appreciated that more than two hierarchical layers of cloud storage services may be used to store data blocks of the files of the file system 111. Similarly, although primarily depicted and described herein with respect to use of two cloud storage services 120 to store data blocks of the files of the file system 111, it will be appreciated that more than two cloud storage services 120 may be used to store data blocks of the files of the file system 111. In other words, any suitable number of cloud storage services 120, associated with any suitable number of hierarchical layers of cloud storage services 120, may be used to store the data blocks of the files of the file system 111.

Although primarily depicted and described herein with respect to embodiments in which the file system is a cloud file system maintained using cloud storage services, it is noted that various embodiments of data block storage management depicted and described herein may be applied for managing storage of data blocks of other types of file systems (e.g., database systems or the like).

Figure 5:
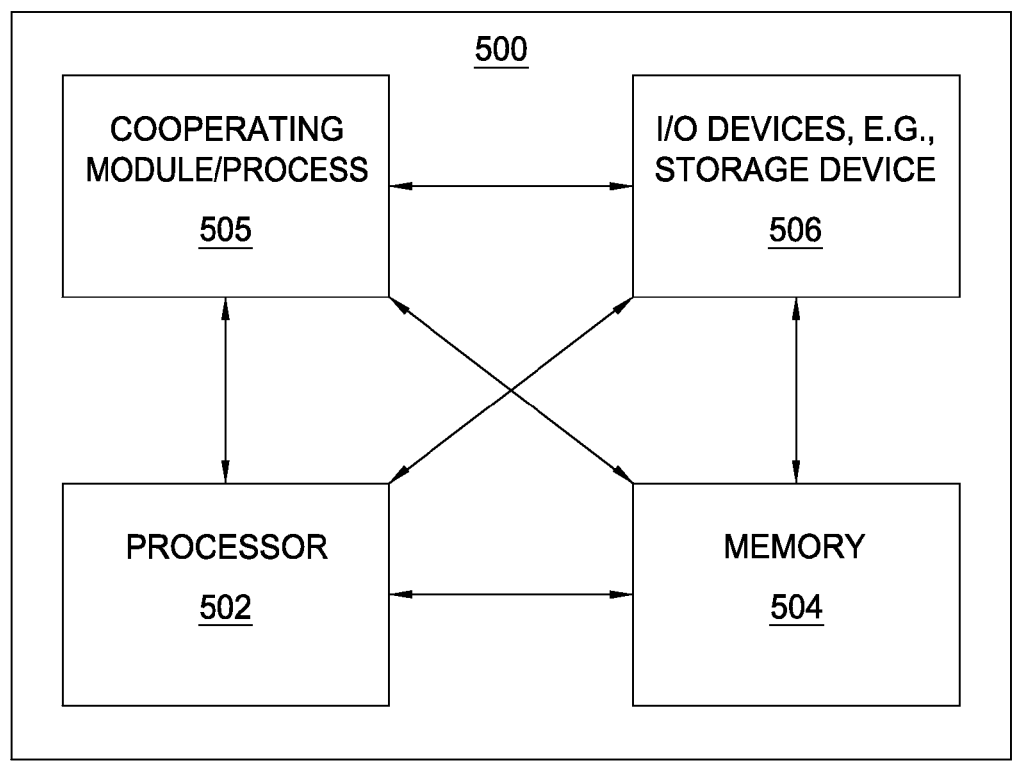
FIG. 5 depicts a high-level block diagram of a computer suitable for use in performing functions described herein.

FIG. 5 depicts a high-level block diagram of a computer suitable for use in performing functions described herein.

The computer 500 includes a processor element 502 (e.g., a central processing unit (CPU) and/or other suitable processor(s)) and a memory 504 (e.g., random access memory (RAM), read only memory (ROM), or the like). The computer 500 also may include a cooperating module/process 505 and/or various input/output devices 506 (e.g., a user input device (such as a keyboard, a keypad, a mouse, or the like), a user output device (such as a display, a speaker, or the like), an input port, an output port, a receiver, a transmitter, and storage devices (e.g., a tape drive, a floppy drive, a hard disk drive, a compact disk drive, or the like)). The cooperating process 505 can be loaded into memory 504 and executed by the processor 502 to implement functions as discussed herein and, thus, cooperating process 505 (including associated data structures) can be stored on a computer readable storage medium, e.g., RAM memory, magnetic or optical drive or diskette, or the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of one or more elements of customer environment 110, file system 111, one or more elements of one or more of the cloud storage services 120, cloud file storage management server 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, wherein the processor is configured to manage a plurality of data blocks of a file system using a first storage service and a second storage service, wherein the first storage service has a lower storage cost and a higher input-output cost than the second storage service, wherein ones of the data blocks stored using the second storage service have associated therewith an expected storage duration indicative of a length of time for which the ones of the data blocks are to be stored using the second storage service, wherein the processor is configured to:
determine an expected hit rate of the second storage service, wherein the expected hit rate of the second storage service is based on at least one performance metric associated with the file system;
monitor a current hit rate of the second storage service; and
modify the expected storage duration of the ones of the data blocks stored using the second storage service based on a comparison of the expected hit rate of the second storage service and the current hit rate of the second storage service.

2. The apparatus of claim 1, wherein the at least one performance metric comprises a value indicative of a fraction of total input-output requests to the file system that are to be answered from the second storage service.

3. The apparatus of claim 1, wherein the at least one performance metric comprises at least one Service Level Agreement (SLA).

4. The apparatus of claim 1, wherein, to monitor the current hit rate of the second storage service, the processor is configured to:
update the current hit rate of the second storage service after each input-output request for the second storage service.

5. The apparatus of claim 1, wherein the processor is configured to:
compare the expected hit rate of the second storage service and the current hit rate of the second storage service periodically.

6. The apparatus of claim 1, wherein, to modify the expected storage duration of the ones of the data blocks stored using the second storage service, the processor is configured to:
increase the expected storage duration when the expected hit rate of the second storage service exceeds the current hit rate of the second storage service; and
decrease the expected storage duration when the expected hit rate of the second storage service is less than the current hit rate of the second storage service.

7. The apparatus of claim 1, wherein the processor is configured to:
in response to a determination that the expected storage duration satisfies a threshold, load at least one data block from the first storage service into the second storage service.

8. The apparatus of claim 1, wherein the first storage service comprises disk storage and the second storage service comprises cache storage.

9. The apparatus of claim 1, wherein the first storage service and the second storage service are associated with a common cloud service provider or the first storage service is associated with a first cloud service provider and the second storage service is associated with a second cloud service provider.

10. A method, comprising:
using at least one processor for managing a plurality of data blocks of a file system using a first storage service and a second storage service, wherein the first storage service has a lower storage cost and a higher input-output cost than the second storage service, wherein ones of the data blocks stored using the second storage service have associated therewith an expected storage duration indicative of a length of time for which the ones of the data blocks are to be stored using the second storage service, wherein managing the data blocks of the file system comprises:
   determining an expected hit rate of the second storage service, wherein the expected hit rate of the second storage service is based on at least one performance metric associated with the file system;
   monitoring a current hit rate of the second storage service; and
   modifying the expected storage duration of the ones of the data blocks stored using the second storage service based on a comparison of the expected hit rate of the second storage service and the current hit rate of the second storage service.

11. An apparatus, comprising:
a processor and a memory communicatively connected to the processor, wherein the processor is configured to manage a plurality of data blocks of a file system using a first storage service and a second storage service, wherein the first storage service has a lower storage cost and a higher input-output cost than the second storage service, wherein ones of the data blocks stored using the second storage service have associated therewith respective expected storage durations indicative of respective lengths of time for which the ones of the data blocks stored using the second storage service are to be stored using the second storage service, wherein the processor is configured to:
   determine an expected hit rate of the second storage service, wherein the expected hit rate of the second storage service is based on at least one performance metric associated with the file system;
   monitor a current hit rate of one of the data blocks stored using the second storage service; and
   modify the expected storage duration of the one of the data blocks based on a comparison of the expected hit rate of the second storage service and the current hit rate of the one of the data blocks.

12. The apparatus of claim 11, wherein the at least one performance metric comprises a value indicative of a fraction of total input-output requests to the file system that are to be answered from the second storage service.

13. The apparatus of claim 11, wherein the at least one performance metric comprises at least one Service Level Agreement (SLA).

14. The apparatus of claim 11, wherein, to monitor the current hit rate of the one of the data blocks, the processor is configured to:
   update the current hit rate of the one of the data blocks after each input-output request for the one of the data blocks.

15. The apparatus of claim 11, wherein the processor is configured to compare the expected hit rate of the second storage service and the current hit rate of the one of the data blocks periodically.

16. The apparatus of claim 11, wherein, to modify the expected storage duration of the one of the data blocks, the processor is configured to:
   increase the expected storage duration of the one of the data blocks when the expected hit rate of the second storage service exceeds the current hit rate of the one of the data blocks; and
   decrease the expected storage duration of the one of the data blocks when the expected hit rate of the second storage service is less than the current hit rate of the one of the data blocks.

17. The apparatus of claim 11, wherein the processor is configured to:
   for each of the ones of the data blocks stored using the second storage service, determine whether to evict the data block from the second storage service based on the expected storage duration of the data block.

18. The apparatus of claim 11, wherein the first storage service comprises disk storage and the second storage service comprises cache storage.

19. The apparatus of claim 11, wherein the first storage service and the second storage service are associated with a common cloud service provider or the first storage service is associated with a first cloud service provider and the second storage service is associated with a second cloud service provider.

20. A method, comprising:
using at least one processor for managing a plurality of data blocks of a file system using a first storage service and a second storage service, wherein the data blocks of the file system are stored using a first storage service and a second storage service, wherein the first storage service has a lower storage cost and a higher input-output cost than the second storage service, wherein ones of the data blocks stored using the second storage service have associated therewith respective expected storage durations indicative of respective lengths of time for which the ones of the data blocks are to be stored using the second storage service, wherein managing the data blocks of the file system comprises:
   determining an expected hit rate of the second storage service, wherein the expected hit rate of the second storage service is based on at least one performance metric associated with the file system;
   monitoring a current hit rate of one of the data blocks; and
   modifying the expected storage duration of the one of the data blocks based on a comparison of the expected hit rate of the second storage service and the current hit rate of the one of the data blocks.

\* \* \* \* \*